July 31, 1928.
E. R. WILSON ET AL
1,678,662
VEHICLE SPRING
Filed June 1, 1922    3 Sheets-Sheet 1
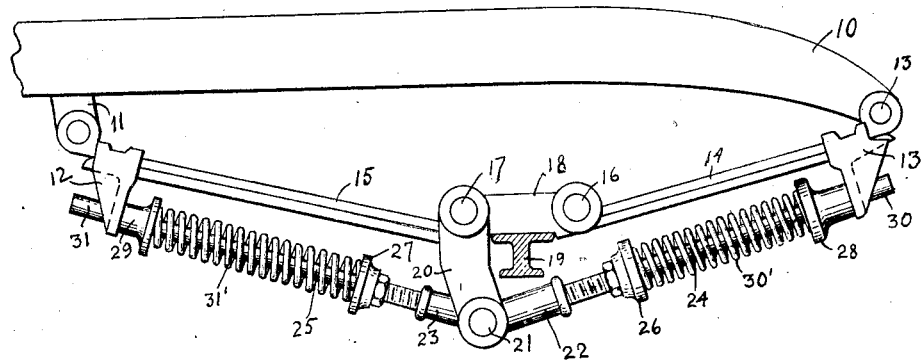
Fig. 1.
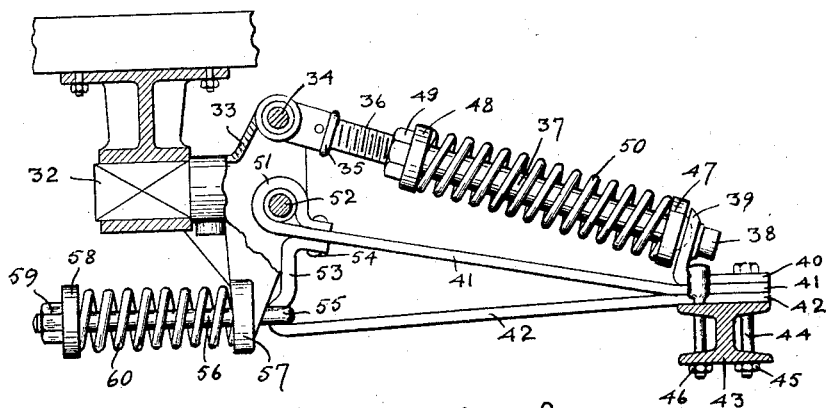
Fig. 2.
Egerton R. Wilson and
Sumner S. Shears
INVENTORS
BY
 ATTORNEY July 31, 1928.
E. R. WILSON ET AL
1,678,662
VEHICLE SPRING
Filed June 1, 1922
3 Sheets-Sheet 2
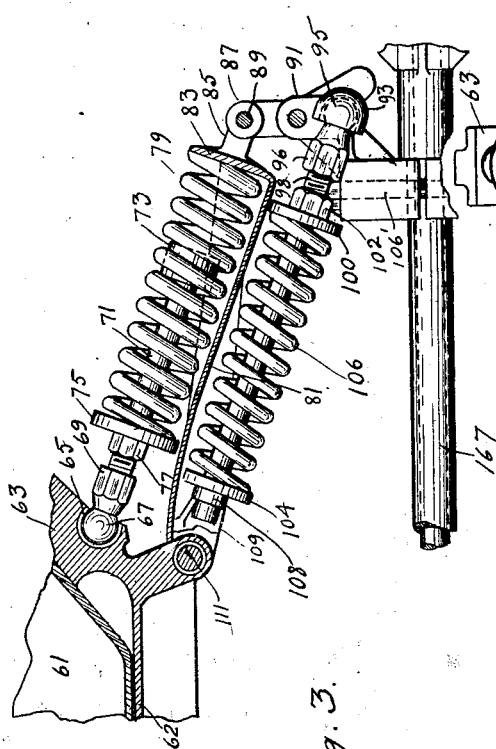
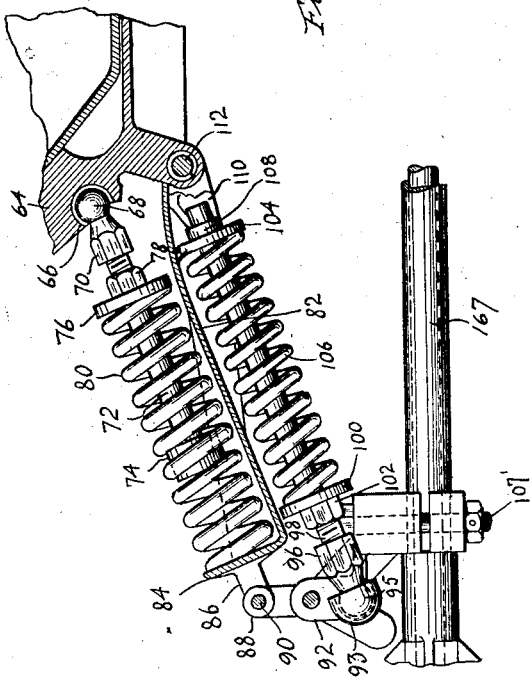
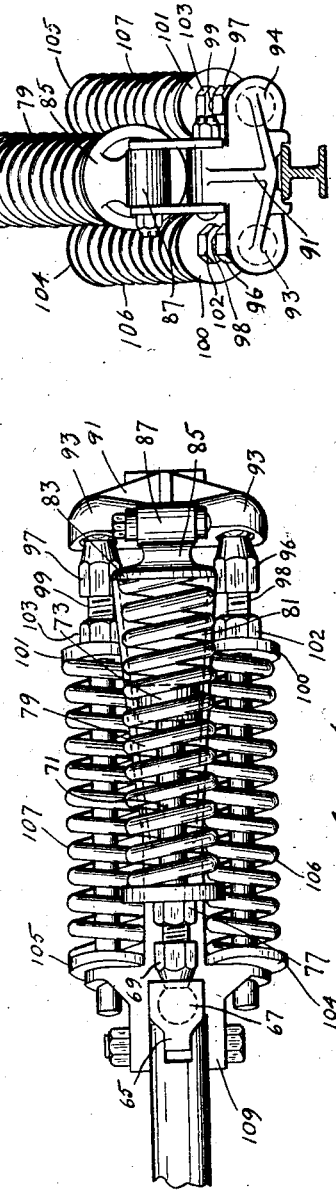
Edgarton R. Wilson
Sumner S. Shears
INVENTORS
BY
ATTORNEY July 31, 1928.
E. R. WILSON ET AL
VEHICLE SPRING
Filed June 1. 1922
1,678,662
3 Sheets-Sheet 3
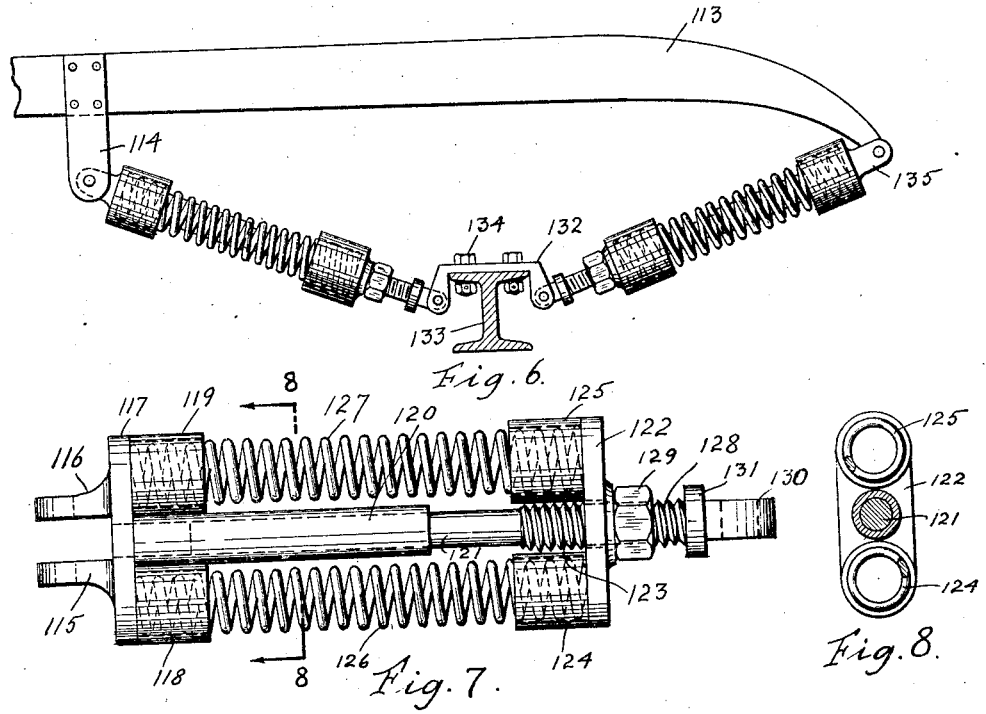

Patented July 31, 1928.

1,678,662

UNITED STATES PATENT OFFICE.

EDGARTON R. WILSON, OF PETERBORO, ONTARIO, CANADA, AND SUMNER S. SHEARS, OF BROOKLYN, NEW YORK; SAID WILSON ASSIGNOR TO SAID SHEARS.

VEHICLE SPRING.

Application filed June 1, 1922. Serial No. 565,100.

This invention relates to improvements in vehicle springs, particularly springs to be used in connection with motor driven vehicles, as for instance described in Lengel and Shears Patent No. 1,336,468, dated April 13th, 1920, and in the co-pending application Serial No. 371,677, filed April 6, 1920, in the name of Sumner S. Shears, said Shears being the inventor named in this application, said application having matured into Patent No. 1,505,222, dated August 19, 1924.

It is the principal object of the invention to provide vehicle springs which are adapted to carry the weight of the vehicle body in an indirect manner, disseminating the shock longitudinally, reducing the possibility of rebound by means of a direct leverage ratio and thereby making for better traction and a wheel oscillation independent of body movement.

With these ends in view, the invention consists in the peculiar arrangement of levers pivotally fulcrumed at the vehicle frame, and combined with horizontally or slantingly arranged coil springs so placed or arranged as to give a substantial leverage ratio.

These and other objects and advantages of our invention will become more fully apparent as the description thereof proceeds, and will then be more specifically pointed out in the appended claims.

In the accompanying drawings, forming a material part of the disclosure:

Figure 1 is a side elevational view of a spring arrangement constructed according to the present invention attached to the frame of the standard type automobile chassis.

Figure 2 is a similar view of a modified form of spring arrangement, one of the springs being slantingtly, the other horizontally arranged.

Figure 3 is a side elevational view of another modified form of spring arrangement constructed according to the present invention as attached across the rear or front part of the chassis of a motor vehicle.

Figure 4 is a partial top plan view of one of the springs shown in Figure 3, with a modified form of bracket.

Figure 5 is an end elevation thereof.

Figure 6 is a side elevation of a further modified form of spring arrangement with opposed spring sockets pivotally fulcrumed at the axle and frame.

Figure 7 is a top plan view thereof and which shows a telescopic lever to provide for spring movement.

Figure 8 is a cross-section on line 8—8 of Figure 7.

As shown in Figure 1, the frame 10 of the vehicle body, carries a link 11 intermediate its ends to which is fulcrumed a bracket 12, while a similar bracket 13 is fulcrumed at the opposite end of the horn 10. These brackets carry the outer ends of laminated levers 14 and 15, the inner ends of which are pivoted at 16 and 17 to bracket 18 resting on axle 19, arm 20 of which bracket is depending and has pivoted to its lower end, sockets or heads 22 and 23 as at 21, adapted to receive the threaded inner ends of slanting rods 24 and 25 carrying adjustable collars 26 and 27 respectively. The outer ends of these rods 24 and 25 extend slidingly through heads 28 and 29 resting with their outer ends against the brackets 12 and 13 through which the outer ends 30 and 31 of the rods 24 and 25 extend. Springs 30' and 31' surround the rods 24 and 25 between the collars 26 and 27 and the heads 28 and 29 respectively.

As illustrated in Figure 2, the vehicle frame auxiliary bracket 32 and 33 has fulcrumed at its upper end as at 34 a socket or head 35 adapted to receive the inner threaded end 36 of a slanting rod 37, the outer end 38 of which extends slidingly through an eye 39 of a bracket 40 holding the outer ends of lever 41 and 42 upon the axle 43 by the intermediary of bands or clips 44 held in position against the lower face of the axle by means of nuts 45 and 46. Against the eye 39 of bracket 40, rests a collar 47 on rod 37, and another collar 48 is screwed upon the threaded part 36 and held thereon by means of a nut 49, a spring 50 surrounds the rod 37, between collars 47 and 48.

The inner end of the upper lever member 41 is formed into an eye 51, pivoted to a pin 52 of bracket 33, while the lower part (42) of lever 41 is bent upwardly as indicated at 53, forming a short bell crank arm and secured to the lower face of lever 41 as at 54. An eye 55 is formed at the inner end of a horizontal rod 56 extending through the lower end of bracket 33 which forms a collar 57 while a collar 58 is held in place on the opposite end of said rod 56, by means of a nut 59. A spring 60 surrounds the rod 56 between the collars 57 and 58 thereon.

In the modification illustrated in Figures 3, 4 and 5, the end of the chassis frame 61 of a motor car carries a bracket 62 the upper ends 63 and 64 of which have formed therein ball sockets 65 and 66 for the reception of the spherical ends 67 and 68 of screw sockets 69 and 70 into which are screwed the inner ends of slanting rods 71 and 72 respectively, the outer ends of which carry guide collars or heads 73 and 74. Near the outer faces of the sockets 69 and 70, these rods 71 and 72 carry collars 75 and 76 held in place on these rods by adjusting nuts 77 and 78 respectively, for the springs 79 and 80.

Springs 79 and 80 are coiled with their inner ends around the rods 71 and 72 and rest against the collars 75 and 76, while their outer ends rest against collars 83 and 84. These collars are provided with outer necks 85 and 86 ending in double acting levers 87 and 88 through which bolts 89 and 90 are passed by means of which the levers are secured to one arm of spring hangers 91 and 92 carrying sockets 93 and 94 for the ball-shaped ends 95 of heads 96. The outer end of levers 109 and 110 operates top spring 79, and the inner end of the levers 109 and 110 operates lower spring 106. Heads 96 are provided with inner screw thread for the reception of the threaded outer ends of rods 98 carrying collars 100, held in place by means of adjusting nuts 102 on rods 98 which near their inner ends carry similar collars 104, and springs 106 envelope the rods 98 between the collars 100 and 104, respectively. The spring hangers 91 are secured by means of bolts 106' and 107' to the axle 167 of the vehicle. The inner ends of the rods 98 rest in bearings 108 in yoke formed head of levers 109 and 110 fulcrumed at the lower ends of the bracket as at 111 and 112.

The device operates as follows:

The lever operates the top spring 79 and 80 at its outer end 87 and 88 the weight or resistance point being ball-joint 67 and 68. The bearings 111 and 112 give therefore a substantial ratio and the first leverage. The inner end of the lever connection 109 and 110 is the power end, and operates the lower springs 106. The weight or resistance point for spring 106 is ball-joint 95 giving a substantial fulcrum over the outer end of the levers 89 and 90. This gives the second lever action.

In the modifications illustrated in Figures 6 to 8, the vehicle frame 113 provided with a depending lug 114 to the lower end of which are pivotally secured the eyes 115 and 116 of slanting yoke 117 carrying at its inner face two sockets 118 and 119 and between both sockets in approximately its center, the end of a sleeve lever 120 in which a rod 121 is telescopically arranged, passing with its opposite end through a movable yoke 122 and provided with a thread 123 at the yoke end. This inner face of the yoke carries on both sides of the rod sockets 124 and 125 for the reception of the ends of springs 126 and 127, the other ends of which rest in the sockets 118 and 119 respectively. The outer end of rod 121 is threaded as at 123 and 128 and carries an adjusting nut 129 and a collar 131 with an eye 130 by means of which the rod is secured to a bracket 132 resting on the axle 133 of the vehicle and secured thereto by means of bolts and nuts 134. A similar spring arrangement is secured to the other end of bracket 132 and its outer end carries an eye 135 by means of which it is secured to the end of the frame 113.

The operation of the spring arrangements will be clear from the drawings and description without further explanation, all however, involving the production of a desired leverage ratio either by the degree of slant of the levers or spring carrying rods, compared to the length of the short and long bell crank arms and their respective distances from fulcrums, or by either principle separately and while involving the same leverage reduction principle as disclosed by the patent and application above mentioned, said leverage is here obtained in a new and different manner.

It will be clear that changes may be made in the general arrangement and in the construction of the minor details of our invention without deviating from the scope and spirit thereof.

Having thus described our invention what we claim as new and desire to secure by Letters Patent of the United States is—

1. Vehicle spring arrangements of the class described comprising bell-crank levers pivotally fulcrumed at the vehicle frame, flexibly secured rods, brackets depending from the frame and coil springs adjustably applied on said rods in such manner as to provide a substantial leverage ratio against the coils.

2. In a spring arrangement of the class described, the combination with a vehicle frame and axle thereof, of bell-crank levers fulcrumed at the frame at one end, secured to the axles at their other ends, brackets depending from the frame, perforated arms on said levers, rods, said rods sliding with one of their ends through perforations of said lever arms and depending brackets, collars on said rods, resilient means on said rods between said collars, and means for adjusting the tension of said resilient means.

3. Vehicle springs of the class described comprising a lever secured at one end to the vehicle axle and pivoted at its opposite end to the vehicle frame, a slanting arm resting at one end in a bracket on said lever and pivoted at its other end to the frame above the pivot end of said lever, and a spring on said arm adjustable in its tension.

4. In vehicle springs of the class described, comprising levers pivotally fulcrumed at the vehicle frame, fastened to the axles at their power ends and coil springs slantingly applied between the short arms on the levers and a point above and sufficiently near the fulcrums to provide a substantial leverage ratio and be compressed by the upward swing of the levers.

5. In vehicle springs of the class described, comprising a bracket depending from the frame levers pivotally fulcrumed to the depending bracket at their frame ends, fastened to the axles at their power ends, short arms on the levers at the fulcrum ends, eyes below the fulcrums and compression coil springs against the eyes and connected to the short arms on the levers in such manner as to be compressed by the upward swing of the levers, and provide a substantial leverage ratio.

6. In vehicle springs of the class described, comprising levers pivotally fulcrumed at their frame ends, securely fastened to the axle at their power ends, arms projecting upward at the axle ends of the levers, arms projecting downwards at the frame ends of the levers, pivotal joints above the fulcrums, brackets from the frame and coil springs so acting against the pivotal joints and frame brackets as to be compressed by the short arms of the levers on the upward swing of the levers.

7. In vehicle springs of the class described, comprising levers pivotally fulcrumed at their frame ends, securely fastened to the axles at their power ends, arms projecting upward and downward from the levers, near the axle and pivot ends respectively, rods pivoted above the fulcrums, brackets depending from frame, coil springs between the lever arms and pivoted rods and frame brackets so applied as to be compressed by the upward swing of the levers, the positions of the lever arms and springs being such as to provide a substantial leverage ratio.

8. In vehicle springs of the class described, comprising a lever pivotally fulcrumed to the vehicle frame, securely fastened to the axle at its power end, short arms projecting upward from the lever near the axle, short arms projecting downward from the lever near the fulcrum, a bracket depending from the frame, a rod pivoted above the fulcrum, the other end of which passes movably through the short upturned arm of the lever, and coil springs applied to the rod and frame bracket in such manner as to be compressed by the upward swing of the lever.

9. In vehicle springs of the class described, a lever, a means for securing one end of said lever to the vehicle axle, the opposite end of said lever fulcrumed at the vehicle frame, a slanting rod slidable at one end in said securing means and pivoted at its opposite end to the vehicle frame, collars on said rod, a spring wound around said rod between said collars, means for regulating the tension of said spring, and a horizontally arranged resilient means connected with said lever.

10. In vehicle spring arrangements of the character described, the combination of a lever secured at one end to the vehicle axle and fulcrumed at its opposite end to the vehicle frame, a slanting rod and spring arrangement slidingly attached to the axle, and pivoted to the frame, a bracket from the frame, a horizontal rod connected to said lever below its fulcrum a collar on said rod, a spring between said collars and frame bracket supported by said rod, and means for regulating the tension of said spring.

11. In a vehicle spring arrangement of the class described the combination with a vehicle frame and axle thereof, of a bipartite lever secured at one end to said axle, one of the parts of said lever secured to the other for forming a triangular arm, a bracket secured to said frame, to which the other end of said lever is secured, an eye on the end of said lever secured to the axle, a slanting rod sliding with one end in said eye and secured with its other end to the vehicle frame, collars on said rod, resilient means on said rod between said collars, and means for adjusting the tension of said resilient means, a horizontal rod, an eye in the bracket through which one end of said rod extends, a collar on said rod, and resilient means wound around said rod between said collar and bracket.

12. In vehicle springs, in combination with a vehicle frame, levers pivotally connected to a vehicle frame at one end, rigidly connected at their axle ends, slantingly applied rods pivotally connected to axles at one end, their other ends operating movably through guide brackets attached to the levers, coil springs applied to the rods in such manner as to be compressed by the oscillations of the levers, the angle of the rods and springs being such as to assure a substantial leverage ratio.

In testimony whereof, we have affixed our signatures.

EDGARTON R. WILSON.
SUMNER S. SHEARS.